United States Patent
Park et al.

(10) Patent No.: US 9,601,953 B2
(45) Date of Patent: Mar. 21, 2017

(54) RING MAGNET ROTOR OF MOTOR WITH COATING MATERIAL

(71) Applicant: LG INNOTEK CO., LTD., Seoul (KR)

(72) Inventors: Young Il Park, Seoul (KR); Dong Ju Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 94 days.

(21) Appl. No.: 14/107,117

(22) Filed: Dec. 16, 2013

(65) Prior Publication Data
US 2014/0167532 A1   Jun. 19, 2014

(30) Foreign Application Priority Data
Dec. 17, 2012  (KR) .................. 10-2012-0147296

(51) Int. Cl.
*H02K 1/28*   (2006.01)
*H02K 1/22*   (2006.01)
*H02K 1/27*   (2006.01)

(52) U.S. Cl.
CPC ............... *H02K 1/28* (2013.01); *H02K 1/22* (2013.01); *H02K 1/2733* (2013.01); *H02K 1/27* (2013.01)

(58) Field of Classification Search
CPC .. H02K 1/22; H02K 1/27; H02K 1/28; H02K 1/2733
USPC ...... 310/44, 45, 156.21, 156.23, 43, 156.09, 310/156.12, 156.38
IPC ........................................................ H02K 1/28
See application file for complete search history.

(56) References Cited

U.S. PATENT DOCUMENTS

| 2,488,729 | A | * | 11/1949 | Kooyman | H02K 1/2733 264/272.19 |
| 4,206,379 | A | * | 6/1980 | Onda | H02K 1/2733 310/156.12 |
| 4,796,354 | A | * | 1/1989 | Yokoyama | B29C 45/14491 123/146.5 A |
| 5,465,020 | A | * | 11/1995 | Peterson | H02K 3/525 310/194 |
| 6,404,086 | B1 | * | 6/2002 | Fukasaku | H02K 7/1166 310/68 B |
| 6,489,696 | B2 | * | 12/2002 | Sashino | H02K 1/2733 310/156.01 |

(Continued)

FOREIGN PATENT DOCUMENTS

JP   10-336928 A      12/1998
JP   10336928 A   *  12/1998

(Continued)

OTHER PUBLICATIONS

Korean Office Action dated Aug. 21, 2014 issued in Application No. 10-2012-0147296.

(Continued)

*Primary Examiner* — John K Kim
(74) *Attorney, Agent, or Firm* — KED & Associates, LLP

(57) ABSTRACT

A rotor of a motor capable of improving durability of the motor by increasing a bonding force between a ring magnet and a resin. The rotor includes a ring magnet having an insertion hole passing through the center thereof, a shaft inserted into the insertion hole, and a resin that is disposed between the insertion hole and the shaft and fixes the ring magnet and the shaft. The resin extends to upper and lower surfaces of the ring magnet so as to cover at least parts of the upper and lower surfaces of the ring magnet.

10 Claims, 4 Drawing Sheets

(56) References Cited

U.S. PATENT DOCUMENTS

| | | | |
|---|---|---|---|
| 6,900,559 B2* | 5/2005 | Aizawa | H02K 1/02 310/44 |
| 2007/0024126 A1* | 2/2007 | Brennvall | F04B 35/045 310/14 |
| 2007/0262665 A1* | 11/2007 | Park | F16H 49/005 310/80 |
| 2008/0315691 A1* | 12/2008 | Jeung | H02K 1/2733 310/51 |
| 2011/0241467 A1* | 10/2011 | Fujioka | H02K 1/146 310/156.08 |
| 2013/0069469 A1* | 3/2013 | Kodani | H02K 1/2733 310/156.38 |
| 2013/0221784 A1* | 8/2013 | Kori | H02K 1/27 310/90 |
| 2014/0167532 A1* | 6/2014 | Park, II | H02K 1/28 310/45 |

FOREIGN PATENT DOCUMENTS

| | | | |
|---|---|---|---|
| JP | 2004-104928 A | 4/2004 |
| JP | 2005-295736 A | 10/2005 |
| KR | 20-1999-0013754 U | 4/1999 |
| KR | 20-0214716 Y1 | 2/2001 |
| KR | 10-2004-0002581 A | 1/2004 |
| KR | 10-05740461 B1 | 4/2006 |

OTHER PUBLICATIONS

Korean Office Action dated Dec. 24, 2013 issued in Application No. 10-2012-0147296.
Korean Office Action dated Apr. 29, 2014 issued in Application No. 10-2012-0147296.

* cited by examiner

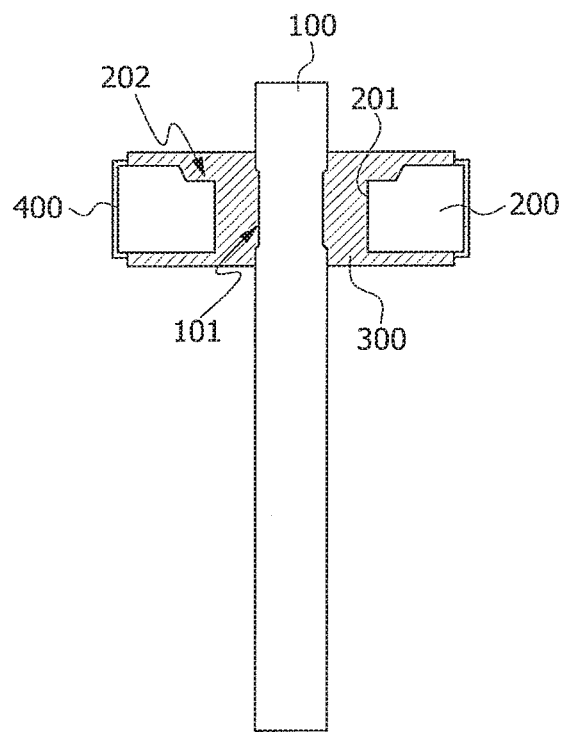
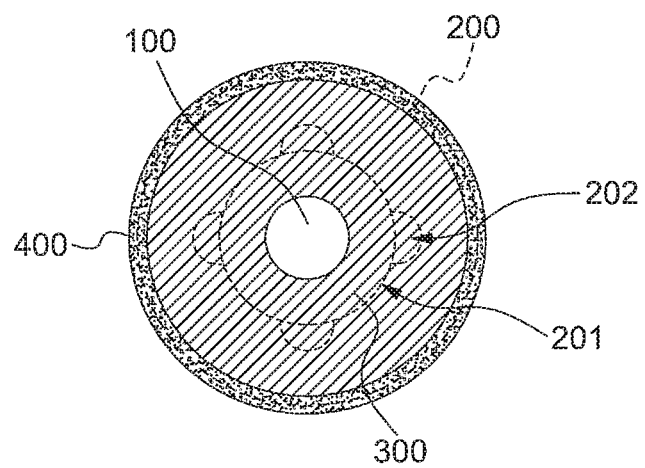

RING MAGNET ROTOR OF MOTOR WITH COATING MATERIAL

CROSS-REFERENCE TO RELATED APPLICATION

This application claims priority to and the benefit of Korean Patent Application No. 10-2012-0147296, filed on Dec. 17, 2012, the disclosure of which is incorporated herein by reference in its entirety.

BACKGROUND

1. Field

The present application relates to a rotor of a motor and, more particularly, to a rotor constituting a ferrite magnet motor.

2. Background

A vehicle transmission is a mechanism that is manually operated by operation of a clutch by a user or is automatically operated according to a speed. The transmission includes a motor.

As the motor of the transmission, an interior permanent magnet (IPM) motor in which a permanent magnet is buried in a rotor is generally used.

The IPM motor uses a NdFeB permanent magnet that is lightweight and has very strong magnetism, and has high efficiency and output density.

The NdFeB permanent magnet contains neodymium that is a rare-earth element. Due to increases in prices of rare-earth elements, a manufacturing cost of the motor itself is inevitably increased.

For this reason, a recent trend shows that interest is focused on a rare-earth-free motor in which no rare-earth elements are used.

Rare-earth-free motors include a ferrite magnet motor, an induction motor, a reluctance motor, and so on. Among these motors, the ferrite magnet motor is most representative.

The ferrite magnet motor is a motor using a ferrite magnet that is a ceramic magnet. In comparison with the rare-earth motor, the ferrite magnet motor is inexpensive, and is easily designed.

The ferrite magnet motor is generally made up of a ferrite ring magnet having an insertion hole, and a shaft inserted into the insertion hole. The ring magnet and the shaft are fixed by a resin.

Here, the resin is disposed only on a contact region between the shaft and the ring magnet.

For this reason, the ferrite magnet motor provides a low bonding force between the ring magnet and the resin. When the motor is abruptly stopped, the ring magnet is separated from the resin due to inertia of a rotor.

Further, the ferrite magnet is very vulnerable to impact by nature. Since upper and lower surfaces of the ring magnet are exposed to the outside, cracks are frequently generated when the motor is used. Performance of the motor is reduced by leakage from such cracks.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 3 is a side cross-sectional view showing a rotor of a motor according to another embodiment of the present application;

FIG. 4 shows an upper surface of the rotor of the motor according to the other embodiment of the present application;

DETAILED DESCRIPTION

Figure 1:
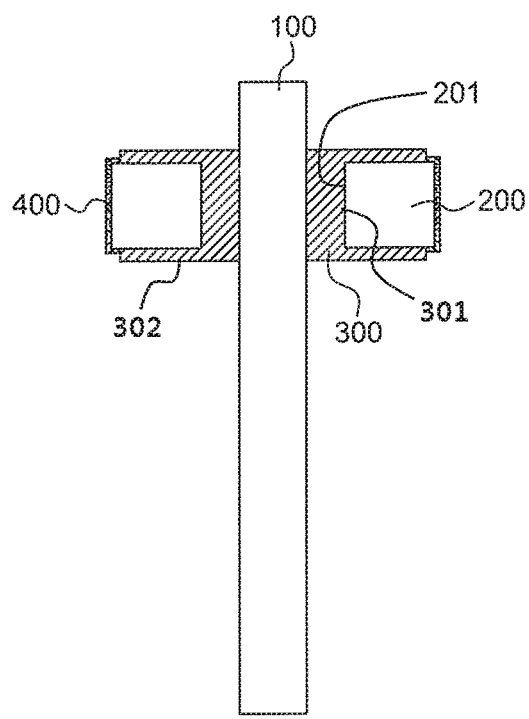
FIG. 1 is a side cross-sectional view showing a rotor of a motor according to an embodiment of the present application.

Hereinafter, exemplary embodiments of the present application will be described in detail. However, the present application can be implemented in various forms, and embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the application.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will also be understood that when a component such as a layer, a film, a region, or a plate is referred to as being "on" another component, the component may be "directly on" the other component, or intervening components may be present. In contrast, when a component may be "directly on" another component, no intervening components may be present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

Unless otherwise defined, all terms used herein, including technical or scientific terms, have the same meanings as those generally understood by those with ordinary knowledge in the field of art to which the application belongs. Such terms as those defined in a generally used dictionary are to be interpreted to have the meanings equal to the contextual meanings in the relevant field of art, and are not to be interpreted to have ideal or excessively formal meanings unless clearly defined in the present application With reference to the appended drawings, exemplary embodiments of the present application will be described in detail below. To aid in understanding the present application, like numbers refer to like elements throughout the description of the figures, and the description of the same elements will be not reiterated.

Figure 2:
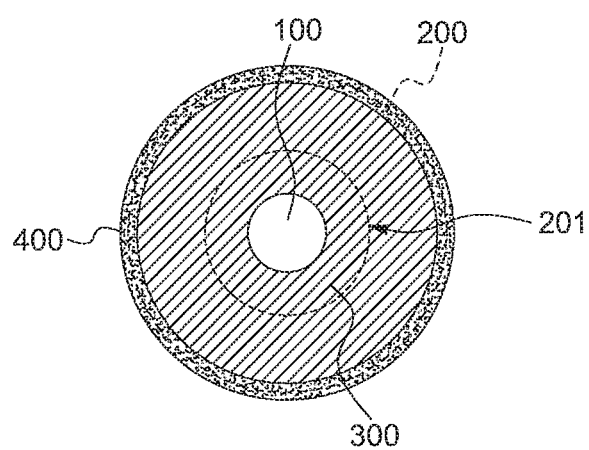
FIG. 2 shows an upper surface of the rotor of the motor according to the embodiment of the present application.

FIG. 1 is a side cross-sectional view showing a rotor of a motor according to an embodiment of the present application, and FIG. 2 shows an upper surface of the rotor.

Referring to FIGS. 1 and 2, a rotor of a motor according to an embodiment of the present application includes a shaft 100, a ring magnet 200, and a resin 300.

The ring magnet 200 has an insertion hole 201 passing through the center thereof. The shaft 100 is inserted into the insertion hole 201 of the ring magnet 200.

The resin 300 is disposed between an inner surface of the insertion hole 201 and the shaft 100, and fixes the ring magnet 200 and the shaft 100. Further, the resin 300 extends to upper and lower surfaces of the ring magnet 200 so as to cover the upper and lower surfaces of the ring magnet 200.

In other words, the resin 300 is a fixing member fixing the ring magnet 200 and the shaft 100. A pocket 301 in which the ring magnet 200 is housed is formed in an outer circumferential surface of the resin 300.

In detail, the resin 300 may cover at least parts of the upper and lower surfaces of the ring magnet 200. That is, the resin 300 may be formed to cover parts of the upper and lower surfaces of the ring magnet 200 as shown in FIGS. 1 and 2, or to cover all of the upper and lower surfaces of the ring magnet 200.

In the rotor of the conventional ferrite magnet motor, the resin is disposed only between the insertion hole of the ring magnet and the shaft. Thus, unlike the present application shown in FIGS. 1 and 2, the related art is configured so that the upper and lower surfaces of the resin are flush with the upper and lower surface of the ring magnet.

In the related art, a bonded region between the resin and the ring magnet is present only on the inner surface of the insertion hole. As such, as mentioned in the section "Discussion of Related Art," the bonding force between the ring magnet and the shaft is consequently low, and the upper and lower surfaces of the ring magnet are exposed to the outside, causing cracking and leakage.

In contrast, in the present application, the resin 300 is formed to cover the upper and lower surfaces of the ring magnet 200 as shown in FIGS. 1 and 2. As such, a bonded surface between the ring magnet 200 and the resin 300 is increased compared to the related art, and a mutual bonding force can be improved. Further, due to the resin 300, exposed areas of the upper and lower surfaces of the ring magnet 200 are reduced. As such, cracks generated from the ring magnet 200 are reduced. Even when cracking occurs, leakage to the outside can be prevented, and performance of the motor can be improved.

According to an embodiment, the resin 300 may be formed by injection molding.

FIGS. 3 and 4 show a rotor of a motor according to another embodiment of the present application. FIG. 3 is a side cross-sectional view, and FIG. 4 shows an upper surface of the rotor.

In the embodiment of FIGS. 1 and 2, the upper and lower surfaces of the ring magnet 200 and the inner surface of the insertion hole 201 are formed in a straight line. However, in the embodiment of FIGS. 3 and 4, at least parts of upper and lower surfaces of a ring magnet 200 and an inner surface of an insertion hole 201 are provided with at least one magnet fixing recess 202. In detail, the magnet fixing recess 202 may be formed in the upper and lower surfaces of the ring magnet 200, and extend to the inner surface of the insertion hole 201. Disposition of a shaft 100, a ring magnet 200, and a resin 300 is identical as in the embodiment of FIGS. 1 and 2.

When the resin 300 is formed in and on the upper and lower surfaces of the insertion hole 201 of the ring magnet 200, the resin 300 is inserted into the magnet fixing recess 202. Thereby, a bonding force between the ring magnet 200 and the resin 300 can be further improved.

To be more specific, when a contact surface between the ring magnet 200 and the resin 300 is flat, a flat surface of the ring magnet 200 may be separated from the resin 300 by inertia of the ring magnet 200 in the process in which the rotor is rotated and then stopped in view of a characteristic of the rotor repeating rotation and a stop.

However, when the resin 300 is inserted into the magnet fixing recess 202, a sort of fastening structure in which the resin 300 functions to catch the ring magnet 200 is formed. As such, the bonding force can be improved.

At least one magnet fixing recess 202 may be locally or continuously formed in a bonded surface with the resin 300, and may be formed in a stepped shape as shown in FIGS. 3 and 4.

Further, to provide the same function as the fixing recess 202 of the ring magnet 200, the shaft 100 is provided with at least one shaft fixing recess 101 in a bonded surface with the resin 300. At least one shaft fixing recess 101 is locally or continuously formed in an outer circumferential surface of the shaft 100 so as to improve a bonding force between the resin 300 and the shaft 100.

Figure 5:
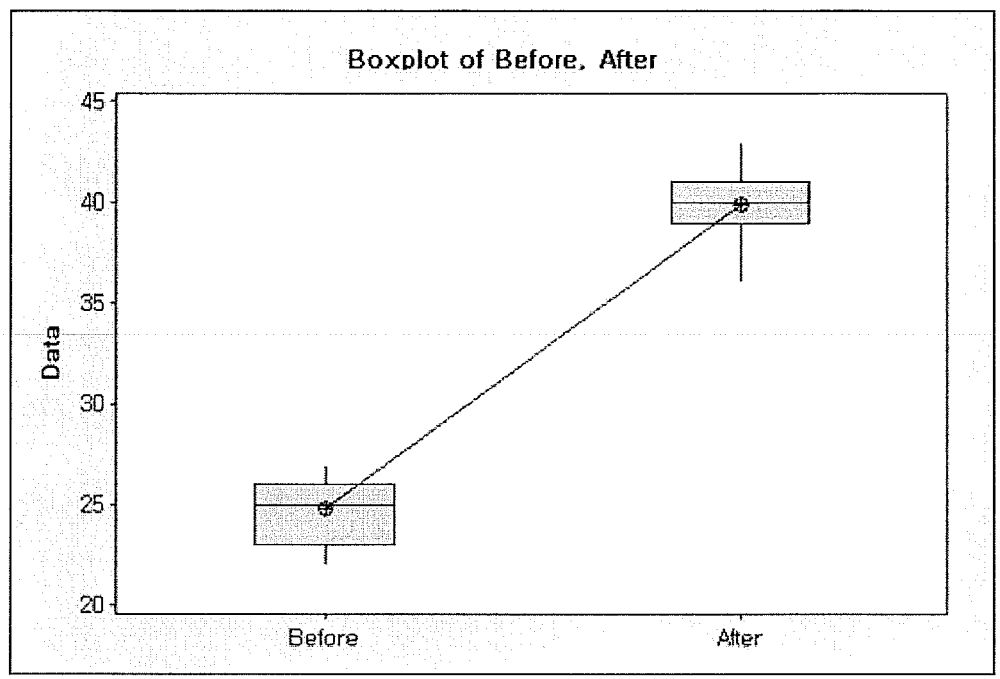
FIG. 5 is a graph showing results of measuring slip torque of a motor to which the rotor according to the embodiment of the present application is applied.

FIG. 5 is a graph showing results of measuring slip torque of a motor to which the rotor according to the embodiment of the present application is applied. The slip torque refers to torque that causes the magnet to slip apart from the resin when the rotor is abruptly stopped while being rotated.

In FIG. 5, a longitudinal axis indicates a value of torque (N·m), and a transverse axis indicates a conventional motor for the left (Before) and the motor using the rotor according to the present application for the right (After).

Referring to FIG. 5, the torque of about 25 N·m is generated in the case of the conventional motor, and the torque of about 45 N·m is generated in the case of the motor using the rotor according to the present application. It can be seen that the torque of the motor using the rotor according to the present application is remarkably improved compared to that of the conventional motor.

Meanwhile, in another embodiment of the present application, the ring magnet 200 may be coated with a coating material. Teflon may be used as the coating material.

Although the exposed surfaces, i.e. the parts of the upper and lower surfaces, and the outer circumferential surface of the ring magnet 200 are coated with a coating material 400 in the embodiment (FIGS. 1 and 2) and the other embodiment (FIGS. 3 and 4) of the present application, this is merely illustrative. The surface of the ring magnet 200 may be coated in part or in whole.

Further, a coating layer may be formed on the resin 300 extending to the upper and lower surfaces of the ring magnet 200 (an outer surface of the pocket). In this case, the slip torque of the ring magnet 200 can be increased by a bonding force between the resin 300 and the coating layer.

A coating method may include a step of sanding the surface of the ring magnet 200 to be coated, a step of preheating the coating material 400 to coat it on the sanded surface of the ring magnet 200, and a step of post-heating the coated coating material 400. This coating method is merely an example. Without being limited thereto, various coating methods may be applied according to a type of the coating material 400.

Here, the coating material 400 may be formed at a thickness of 10 to 30 μm. When the thickness of the coating material is less than 10 μm, effects of inhibiting corrosion and preventing cracks cannot be obtained. When the thickness of the coating material is more than 30 μm, magnetism of the ring magnet is excessively shielded.

The coating material formed at a thickness of 10 to 30 μm can protect the surface of the ring magnet 200 without influencing the magnetism of the ring magnet 200, and further improve the effect of preventing the cracks.

In addition, due to the coating, an effect of preventing corrosion of the ring magnet 200 can be additionally obtained.

Figure 6:
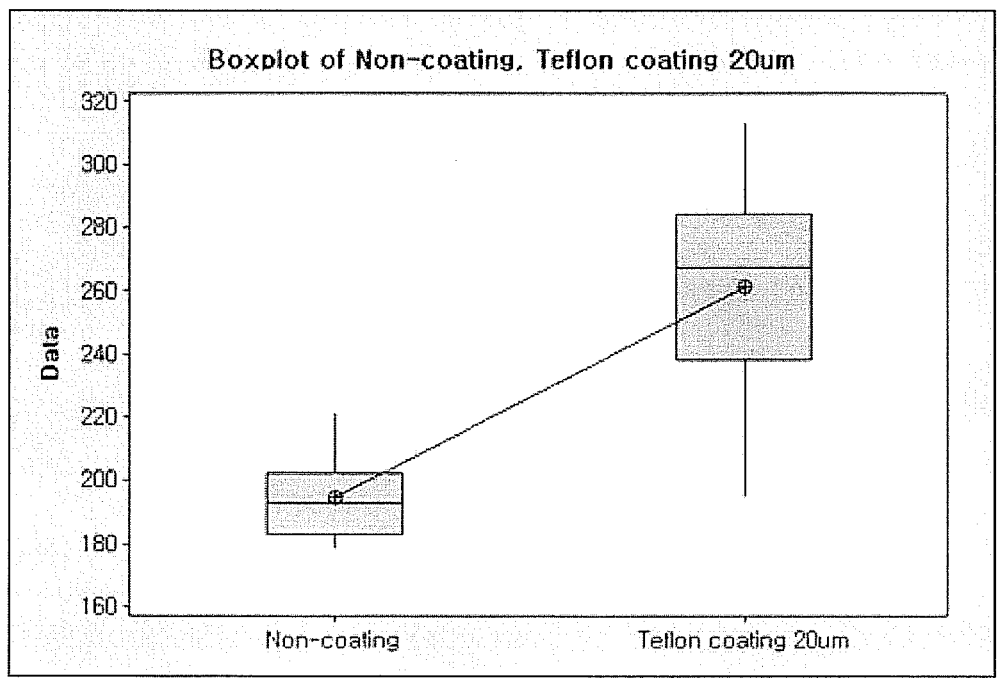
FIG. 6 is a graph showing results of measuring an effect of Teflon coating according to the embodiment of the present application.

FIG. 6 is a graph showing results of measuring an effect of Teflon coating according to the embodiment of the present application.

In FIG. 6, a longitudinal axis indicates a value of resisting pressure of the ring magnet 200, and a transverse axis indicates a case in which the Teflon coating is not performed (for the left) and a case in which the Teflon coating of 20 μm is performed (for the right).

Referring to FIG. 6, it can be seen that the case in which the Teflon coating is performed is improved in resisting pressure performance compared to the case in which the Teflon coating is not performed.

The rotor of the motor of the present application as described above can be applied to a ferrite magnet motor. In addition to the ferrite magnet motor, the rotor of the present application may be variously applied to any motor, in which a shaft and a magnet are fixed by a resin, as needed.

Further, the applied range is not limited to the motor for a transmission of a vehicle. The rotor may be applied to any device for which a motor is used.

Figure 7:
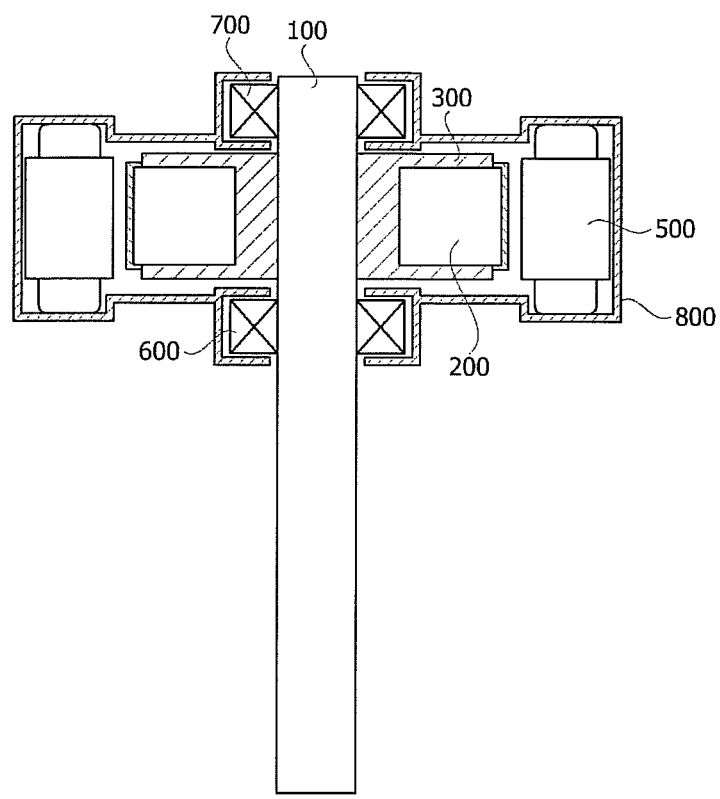
FIG. 7 is a conceptual view of the motor according to the embodiment of the present application.

FIG. 7 is a conceptual view of the motor according to the embodiment of the present application.

Referring to FIG. 7, the motor includes a housing 800, a stator 500 disposed in the housing 800, and a rotor 100, 200, 300 disposed to be rotatable relative to the stator 500. The housing 800 has a space in which the stator 500 and the rotor 100, 200, 300 are housed. When power is applied, the shaft 100 is rotated by an electromagnetic interaction between the stator 500 and the magnet 200 of the rotor. Opposite ends of the shaft 100 are supported by bearings 600 and 700. One side of the shaft is connected to a clutch of the vehicle so as to enable a gear shifting function. The configuration of the rotor is the same as the foregoing, and detailed description thereof is omitted.

The present application is directed to providing a rotor of a motor capable of improving durability of the motor by increasing a bonding force between a ring magnet and a resin.

Further, the present application is directed to providing a rotor of a motor capable of reducing cracks generated from a ring magnet.

According to an aspect of the present application, there is provided a rotor of a motor, which includes: a ring magnet having an insertion hole passing through the center thereof; a shaft inserted into the insertion hole; and a resin that is disposed between the insertion hole and the shaft and fixes the ring magnet and the shaft. The resin extends to upper and lower surfaces of the ring magnet so as to cover at least parts of the upper and lower surfaces of the ring magnet.

Here, the ring magnet may include at least one magnet fixing recess that is formed in the upper or lower surfaces thereof and extend to a bonded surface with the resin, and the resin may be inserted into the magnet fixing recess.

Further, the shaft may include at least one shaft fixing recess that is formed in a bonded surface with the resin, and the resin may be inserted into the shaft fixing recess.

Further, the surfaces of the ring magnet may be coated with a coating material.

Also, at least parts of the upper and lower surfaces and an outer circumferential surface of the ring magnet may be coated with a coating material.

Further, the coating material may be Teflon.

Further, the coating material may be formed at a thickness of 10 to 30 μm.

In addition, the resin may be subjected to injection molding.

According to the present application, the resin is disposed between the insertion hole of the ring magnet and the shaft, and extends to the upper and lower surfaces of the ring magnet so as to cover at least parts of the upper and lower surfaces of the ring magnet. Thereby, a fixing force of the ring magnet is improved, and durability of the motor is improved.

Further, since the resin covers the upper and lower surfaces of the ring magnet, an exposed area of the ring magnet is reduced, and generation of cracks is reduced. Even when the cracks are generated from the ring magnet, the resin disposed on the upper and lower surfaces of the ring magnet protects the ring magnet, and thus there is no risk of reducing performance of the motor due to leakage of debris outside the rotor from the cracks.

In addition, the ring magnet is coated, and an effect of preventing the cracks of the ring magnet can be further improved.

Any reference in this specification to "one embodiment," "an embodiment," "example embodiment," etc., means that a particular feature, structure, or characteristic described in connection with the embodiment is included in at least one embodiment of the application. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A rotor of a motor comprising:
   a ring magnet having an insertion hole passing through a center thereof;
   a shaft inserted into the insertion hole;
   a coating material that covers an outer circumferential surface of the ring magnet; and
   a resin that covers an area between an inner circumferential surface of the insertion hole and the shaft, an upper surface of the ring magnet, and a lower surface of the ring magnet, the ring magnet having at least one first recess provided in the upper surface thereof,
   wherein the at least one first recess includes a bottom surface connected to the insertion hole and a sidewall that connects the bottom surface of the at least one first recess with the upper surface of the ring magnet, and the at least one first recess widens from the bottom surface towards the upper surface of the ring magnet,
   wherein a distance that extends radially from an inner surface of the insertion hole to the outer circumferential surface of the ring magnet is greater than a distance that extends radially from an outermost circumferential surface of the shaft to the inner surface of the insertion hole,
   wherein a distance that extends radially from a center of the shaft to an outermost end of the resin that extends to the upper surface and the lower surface of the ring magnet is greater than a distance that extends radially from the center of the shaft to an outermost end of the at least one first recess, and
   wherein the coating material includes Teflon and has a thickness of 10 μm to 30 μm.

2. The rotor of claim 1, wherein the shaft includes at least one second recess that has a surface bonded with the resin, and wherein the resin is provided within the at least one second recess.

3. The rotor of claim 1, wherein the coating material extends to the upper and lower surfaces of the ring magnet.

4. The rotor of claim 1, wherein the resin is formed by injection molding.

5. The rotor of claim 1, wherein the ring magnet includes a ferrite.

6. The rotor of claim 1, wherein the at least one first recess has a semicircular shape or a semioval shape.

7. The rotor of claim 1, wherein the resin includes a protrusion coupled to the first recess.

8. The rotor of claim 1, wherein a height from the upper surface to the lower surface of the resin is greater than a height of an outer circumferential surface of the ring magnet.

9. A motor comprising:
   a housing;
   a stator provided in the housing; and
   a rotor provided to be rotatable relative to the stator,
   wherein the rotor includes a ring magnet having an insertion hole passing through the center thereof, a shaft inserted into the insertion hole, a coating material that covers an outer circumferential surface of the ring magnet, and a resin that covers an area between an inner circumferential surface of the insertion hole and the shaft, an upper surface of the ring magnet, and a lower surface of the ring magnet, the ring magnet having at least one first recess provided in the upper surface thereof,
   wherein the first recess includes a bottom surface connected to the insertion hole and a sidewall that connects the bottom surface of the at least one first recess with the upper surface of the ring magnet, and the at least one first recess widens from the bottom surface towards the upper surface of the ring magnet,
   wherein a distance that extends radially from an inner surface of the insertion hole to the outer circumferential surface of the ring magnet is greater than a distance that extends radially from an outer surface of the shaft to the inner surface of the insertion hole,
   wherein a distance that extends radially from a center of the shaft to an outermost end of the resin extending to the upper surface and the lower surface of the ring magnet is greater than a distance that extends racially from the center of the shaft to an outermost end of the at least one first recess,
   wherein the coating material includes Teflon and has a thickness of 10 μm to 30 μm.

10. The motor of claim 9, wherein the shaft includes at least one second recess that has a surface bonded with the resin, and wherein the resin is provided within the at least one second recess.

* * * * *